P. L. GARDNER.
WRENCH.
APPLICATION FILED FEB. 27, 1912.
1,051,727.
Patented Jan. 28, 1913.
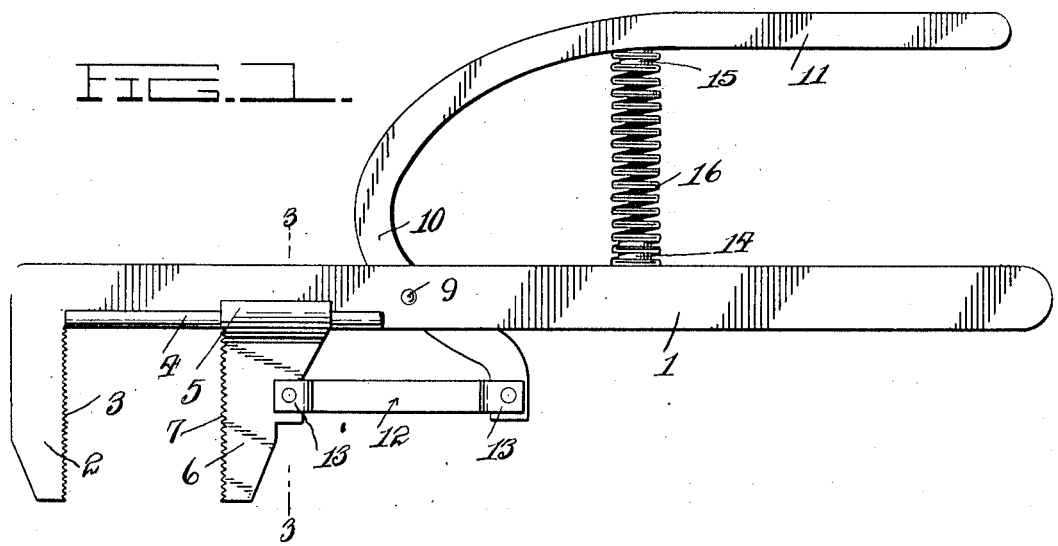
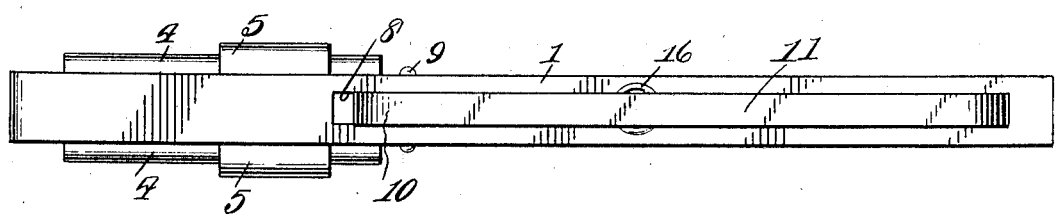
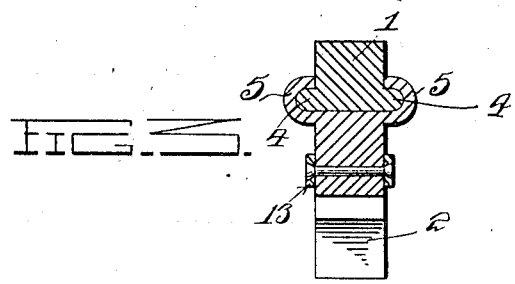
Witnesses
Inventor
P. L. Gardner
Attorneys

UNITED STATES PATENT OFFICE.

PETER L. GARDNER, OF ST. CLOUD, MINNESOTA.

WRENCH.

1,051,727.  Specification of Letters Patent.  Patented Jan. 28, 1913.

Application filed February 27, 1912. Serial No. 680,171.

*To all whom it may concern:*

Be it known that I, PETER L. GARDNER, a citizen of the United States, residing at St. Cloud, in the county of Stearns, State of Minnesota, have invented certain new and useful Improvements in Wrenches; and I do hereby declare the following to be a full, clear, and exact description of the invention, such as will enable others skilled in the art to which it appertains to make and use the same.

This invention relates to improvements in wrenches, and has for its object to produce a device of this character which is simple in construction, efficient in operation, and one which may be manufactured at a small cost.

A further object of the invention is to produce a wrench which may be easily and quickly adjusted to remove or tighten nuts or pipes of different sizes.

With these and other objects in view the invention consists in certain novel features of construction, combination and arrangement of parts as will be hereinafter fully described and claimed.

In the drawing: Figure 1 is a side elevation of the device. Fig. 2 is a top plan view. Fig. 3 is a sectional view on line 3—3 of Fig. 1.

Referring to the drawing, the numeral 1 designates the shank, the same being preferably rectangular in cross section, and at one end of which is formed a fixed jaw 2, the inner face of which being preferably provided with serrations 3. Formed integral with the shank 1, and upon opposite sides thereof are laterally extending flanges 4, said flanges being adapted to slidably receive the curved lips 5 formed upon the rear edge of the movable jaw 6. The movable jaw 6 is also provided with serrations 7, which in conjunction with the serrations 3 of the jaw 2 serve to clamp a nut or pipe in an effective manner. A slot 8 is formed intermediate the ends of the shank 1, and passing therethrough is a transversely arranged pin 9 by which the reversely curved end 10 of the lever 11 is pivotally connected.

To move the jaw 6 toward or away from the jaw 3, a link 12 is provided, both ends of which being formed with furcations 13, and by which the link is pivotally connected to the jaw 6 and extreme front end of the curved end 10 of the lever.

Formed upon the upper edge of the shank 1 is a circular lug 14, a similar lug being also formed upon the lower edge of the lever 11, the same being designated by the numeral 15. Interposed between the lever 11 and shank 1 is a coil spring 16, the lugs 14 and 15 serving to prevent accidental displacement of the shank. The coil spring 16 tends to force the lever 11 outwardly and away from the shank 1 whereby the movable jaw 6 is normally held out of engagement with the jaw 2.

When it is desired to adjust the jaws for gripping a nut or the like, it is only necessary that the operator grasps the shank 1 and lever 11, so that the hand spans the same, whereupon pressure being applied, the jaw 6 is moved forwardly and the article is gripped.

What is claimed is:

The combination with a shank having a fixed jaw formed at one end, laterally extending flanges carried by the shank, a second jaw having its upper edge provided with curved lips for slidably engaging said flanges, a slot formed intermediate the ends of the shank, a lever pivotally connected intermediate its ends in the slot, a link having furcations formed upon its opposite ends between which is pivotally connected one end of the lever and the second jaw, and means interposed between the shank and lever for holding the second jaw normally out of engagement with the first named jaw.

In testimony whereof, I affix my signature, in presence of two witnesses.

PETER L. GARDNER.

Witnesses:
W. H. ALDEN,
MATT. BECKER, Jr.